(12) United States Patent
Adachi

(10) Patent No.: US 11,320,972 B2
(45) Date of Patent: May 3, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Naoki Adachi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/016,624

(22) Filed: Sep. 10, 2020

(65) Prior Publication Data

US 2021/0271376 A1 Sep. 2, 2021

(30) Foreign Application Priority Data

Feb. 27, 2020 (JP) .............................. JP2020-031670

(51) Int. Cl.
*G06F 3/04842* (2022.01)
*G06F 3/0481* (2022.01)

(52) U.S. Cl.
CPC ........ *G06F 3/04842* (2013.01); *G06F 3/0481* (2013.01)

(58) Field of Classification Search
CPC ......... G06T 7/0004; G06T 2207/30184; G06T 11/00; G06F 3/04842; G06F 3/0481
See application file for complete search history.

(56) References Cited

U.S. PATENT DOCUMENTS

| 2006/0271287 A1* | 11/2006 | Gold | G01C 21/3673 |
| | | | 701/426 |
| 2009/0060263 A1* | 3/2009 | Tsutsui | G01C 21/20 |
| | | | 382/100 |
| 2011/0050888 A1* | 3/2011 | Shibukawa | H04N 1/00411 |
| | | | 348/135 |
| 2011/0239100 A1 | 9/2011 | Terayoko | |
| 2016/0356614 A1* | 12/2016 | O'Beirne | G01C 21/3682 |
| 2017/0052680 A1* | 2/2017 | Chegini | G06F 30/13 |
| 2017/0178376 A1* | 6/2017 | Hong | G06T 11/60 |
| 2020/0132499 A1* | 4/2020 | Majima | G06F 16/29 |

FOREIGN PATENT DOCUMENTS

JP 2011-198251 A 10/2011

OTHER PUBLICATIONS

Rashmi Dubey et al., Volume rendering: A compelling approach to enhance the rendering methodology, Feb. 1, 2016, IEEE Xplore, pp. 712-717 (Year: 2016).*

Jenhwa Guo et al., Image Registration for the Underwater Inspection Using the Maximum a Posteriori Technique, Jan. 3, 2003, IEEE Journal Of Ocean Engineering, vol. 28, No. 1, pp. 55-61 (Year: 2003).*

* cited by examiner

*Primary Examiner* — Tam T Tran

(74) *Attorney, Agent, or Firm* — Oliff PLC

(57) ABSTRACT

An information processing apparatus includes a processor configured to execute a process for displaying multiple regions. The multiple regions include a first region, a second region, and a third region. The first region indicates, on a map, an imaging location of an image saved at a predetermined location such that the imaging location is selectable by a user. The second region presents the image captured at the imaging location selected in the first region, and the third region relates to editing performable by the user on information attached to the image presented in the second region.

12 Claims, 10 Drawing Sheets

FIG. 4

| FILE ID | CONTENT DATA | PREVIEW IMAGE DATA | ATTRIBUTES |
|---|---|---|---|
| doc001 | [BINARY DATA] | [BINARY DATA] | [LIST OF ATTRIBUTES AND ATTRIBUTE VALUES] |
| doc002 | [BINARY DATA] | [BINARY DATA] | [LIST OF ATTRIBUTES AND ATTRIBUTE VALUES] |
| doc003 | [BINARY DATA] | [BINARY DATA] | [LIST OF ATTRIBUTES AND ATTRIBUTE VALUES] |

FIG. 5

| ATTRIBUTE | ATTRIBUTE VALUE |
|---|---|
| NAME | XX_PEDESTRIAN_BRIDGE_01 |
| UPDATE DATE AND TIME | 03/09/2019/15:00:00 |
| IMAGING DATE AND TIME | 03/07/2019/12:00:00 |
| LATITUDE | 35.44 |
| LONGITUDE | 139.62 |
| ALTITUDE | 5.23 |
| REFERENCE ALTITUDE | SEA LEVEL |
| IMAGING DIRECTION | 184.77 |
| STATE | UNDER INSPECTION AND DIAGNOSIS |
| CATEGORY OF INSPECTION RESULT | IV: UNDER TEMPORARY REPAIR |
| CATEGORY OF DAMAGE | OUTER WALL, ETC. |
| DETAILS OF DAMAGE | SEVERE CRACK IN GLASS OF OUTER WALL |

| UPLOAD | | |
|---|---|---|
| FILE | IMG_20190227_120000... | |
| SELECTED ATTRIBUTE TEMPLATE | ROAD INSPECTION ▼ | |

| No. | ATTRIBUTE | VALUE |
|---|---|---|
| 1 | NAME | MINATOMIRAI PEDESTRIAN BRIDGE-PASSAGEWAY-OUTER-WALL 01 |
| 2 | IMAGING DATE AND TIME | 03/07/2019  12:00:00.000 |
| 3 | LATITUDE | 35.462907 |
| 4 | LONGITUDE | 139.626571 |
| 5 | CATEGORY OF INSPECTION RESULT | IV. UNDER TEMPORARY REPAIR |
| 6 | CATEGORY OF DAMAGE | OUTER WALL: ETC. |
| 7 | DETAILS OF DAMAGE | CRACK IN GLASS OF OUTER WALL |
| 8 | PROVISIONAL MEASURE | COVER WITH BOARD AND SET OFF-LIMITS CONE |
| 9 | DETAILS OF REPAIR | |
| 10 | REMARKS | |

REGISTER — 211

CANCEL

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-031670 filed Feb. 27, 2020.

BACKGROUND

(i) Technical Field

The present disclosure relates to information processing apparatuses and non-transitory computer readable media.

(ii) Related Art

Japanese Unexamined Patent Application Publication No. 2011-198251 discloses an inspection-information processing apparatus including an inspection-data input unit and an inspection-sheet generating unit. The inspection-data input unit receives inspection data containing drawing information of an inspection target. The inspection-sheet generating unit generates an inspection sheet by setting the drawing information of the inspection data received by the inspection-data input unit to a predetermined output template with a specific format that allows an inspection image and an inspection result corresponding to the inspection target to be set in a portable information processing device and that also allows the set inspection image and inspection result corresponding to the inspection target and the drawing information to be mutually browseable on the portable information processing device.

SUMMARY

In a case where an architectural structure, such as a building, or a structure, such as a bridge or a pedestrian bridge, is to be inspected, it is compulsory by law to leave an image of an inspection result as a proof. However, many images of inspection results are similar to each other while also being different from each other, and the number of images is also enormous. With only the images of the inspected locations and the attribute information of the images, a process for checking the inspection results and a process for editing information about the inspection results are time-consuming.

Aspects of non-limiting embodiments of the present disclosure relate to an information processing apparatus and a non-transitory computer readable medium that may assist with a process for checking an inspection result as well as a process for editing information about the inspection result.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to execute a process for displaying multiple regions. The multiple regions include a first region, a second region, and a third region. The first region indicates, on a map, an imaging location of an image saved at a predetermined location such that the imaging location is selectable by a user, and the second region presents the image captured at the imaging location selected in the first region. The third region relates to editing performable by the user on information attached to the image presented in the second region.

BRIEF DESCRIPTION OF THE DRAWINGS

An exemplary embodiment of the present disclosure will be described in detail based on the following figures, wherein:

FIG. 4 illustrates an example of information registered in a file database;

FIG. 5 illustrates an example of attribute information;

FIG. 7 illustrates an example of a user interface;

FIG. 8 illustrates an example of a user interface;

DETAILED DESCRIPTION

Figure 1:
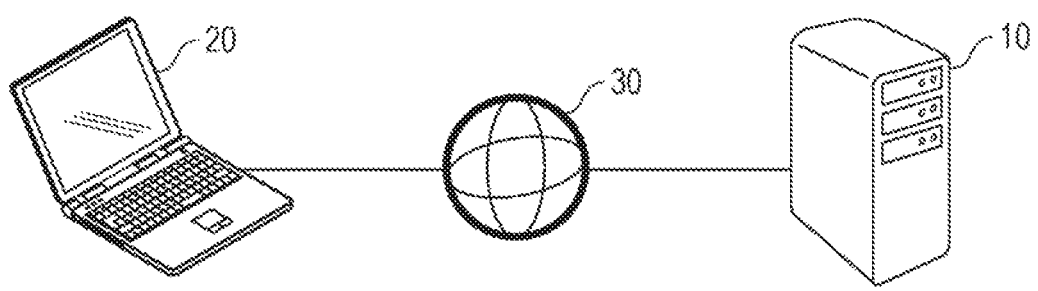
FIG. 1 schematically illustrates the configuration of an information processing system according to an exemplary embodiment.

An exemplary embodiment of the present disclosure will be described below with reference to the drawings. In the drawings, identical or equivalent components and sections are given the same reference signs. Furthermore, the dimensional ratios in the drawings are exaggerated for the sake of convenience and may sometimes differ from the actual ratios.

FIG. 1 schematically illustrates the configuration of an information processing system according to this exemplary embodiment. The information processing system according to this exemplary embodiment is used by a user involved in an inspection operation of, for example, a road, tunnel, bridge, or pedestrian bridge. The information processing system shown in FIG. 1 includes a management server 10 as an information processing apparatus, and also includes a terminal apparatus 20. The management server 10 and the terminal apparatus 20 are connected to each other by a network 30, such as the Internet or an intranet. The network 30 may be a wired line or a wireless line, or may be a dedicated line used by a specific user alone or a public line shared among an indefinite number of unspecified users.

The management server 10 saves an image file containing an image captured at an inspection site during the inspection operation and information attached to the image. The management server 10 provides the image file and information related to the inspection operation in response to a request from the user.

The terminal apparatus 20 is used by the user of the information processing system. The terminal apparatus 20 may be any type of a terminal, such as a desktop computer, a notebook computer, a tablet, or a smartphone, so long as the terminal apparatus 20 is capable of displaying information provided from the management server 10 and accepting an information-editing operation from the user.

When an operation for registering an image file is performed in the terminal apparatus 20 and a request for registering the image file in the management server 10 is transmitted from the terminal apparatus 20 to the management server 10, the management server 10 registers the image file requested for registration. Then, when an operation for browsing an image file is performed in the terminal apparatus 20 and a request for browsing the image file is transmitted from the terminal apparatus 20 to the management server 10, the management server 10 presents the requested image file to the terminal apparatus 20. An example of a user interface used when an image file is to be registered and browsed will be described later.

The information processing system shown in FIG. 1 only includes a single terminal apparatus 20, but may alternatively include multiple terminal apparatuses 20. Moreover, the information processing system may include multiple management servers 10.

Figure 2:
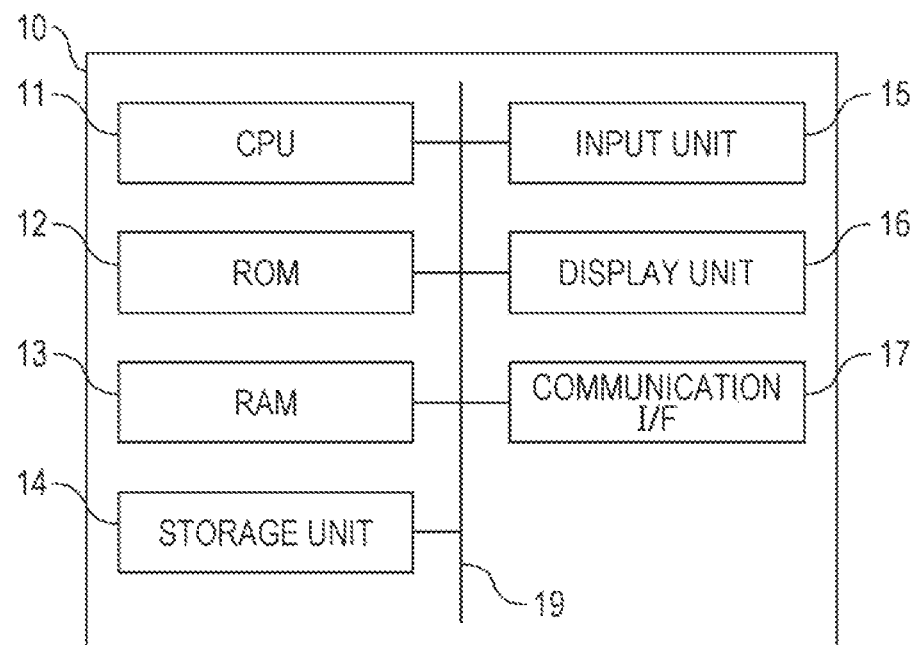
FIG. 2 is a block diagram illustrating a hardware configuration of a management server.

FIG. 2 is a block diagram illustrating a hardware configuration of the management server 10.

As shown in FIG. 2, the management server 10 has a central processing unit (CPU) 11, a read-only memory (ROM) 12, a random access memory (RAM) 13, a storage unit 14, an input unit 15, a display unit 16, and a communication interface (I/F) 17. These components are connected to one another in a communicable manner by a bus 19.

The CPU 11 is a central processing unit that executes various types of programs and controls each component. Specifically, the CPU 11 reads a program from the ROM 12 or the storage unit 14 and executes the program by using the RAM 13 as a work area. The CPU 11 performs control of the aforementioned components and various types of arithmetic processes in accordance with programs stored in the ROM 12 or the storage unit 14. In this exemplary embodiment, the ROM 12 or the storage unit 14 stores therein an image management program that manages an image captured at an inspection site and that provides a user interface for assisting with the inspection operation to the terminal apparatus 20.

The ROM 12 stores therein various types of programs and various types of data. The RAM 13 serves as a work area that temporarily stores a program or data. The storage unit 14 is a storage device, such as a hard disk drive (HDD), a solid state drive (SSD), or a flash memory, and stores therein various types of programs, including an operating system, and various types of data.

The input unit 15 includes a pointing device, such as a mouse, and a keyboard, and is used for performing various types of input operations.

The display unit 16 is, for example, a liquid crystal display and displays various types of information. The display unit 16 may be of a touchscreen type so as to function also as the input unit 15.

The communication I/F 17 is an interface used for communicating with another apparatus, such as the terminal apparatus 20. Examples of standards used include Ethernet (registered trademark), fiber distributed data interface (FDDI), and Wi-Fi (registered trademark).

When executing the aforementioned image management program, the management server 10 uses the aforementioned hardware resources to realize various types of functions. A functional configuration realized by the management server 10 will be described below.

Figure 3:
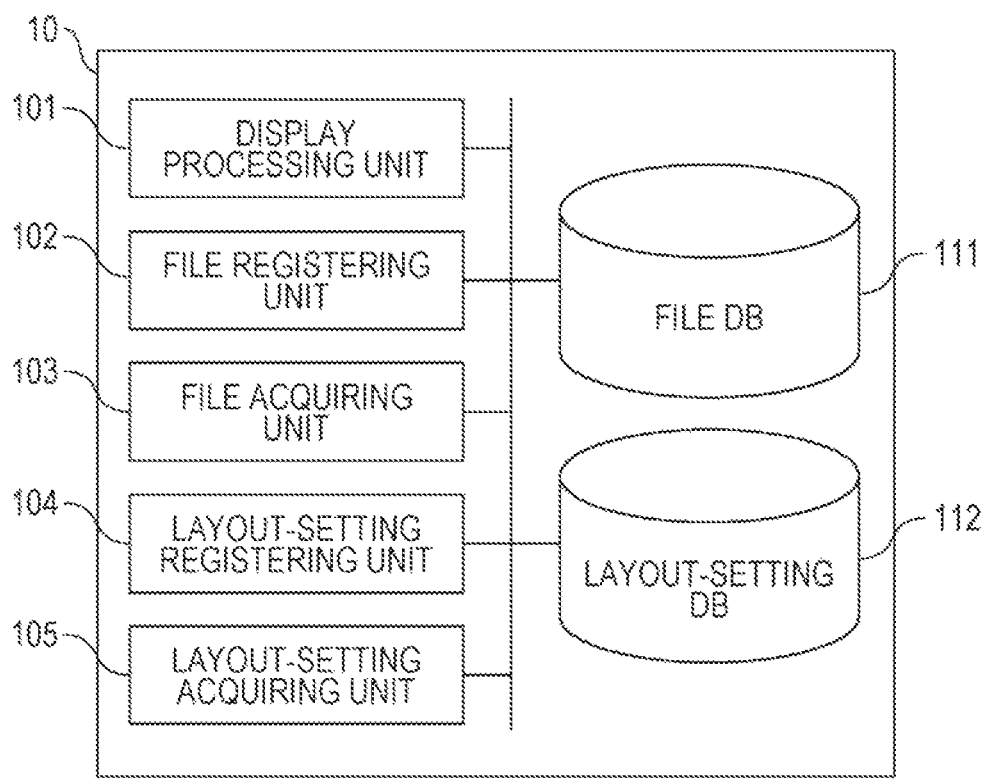
FIG. 3 is a block diagram illustrating an example of a functional configuration of the management server.

FIG. 3 is a block diagram illustrating an example of the functional configuration of the management server 10.

As shown in FIG. 3, the management server 10 has functional components including a display processing unit 101, a file registering unit 102, a file acquiring unit 103, a layout-setting registering unit 104, and a layout-setting acquiring unit 105. Each functional component is realized by the CPU 11 reading the image management program stored in the ROM 12 or the storage unit 14 and executing the program. Furthermore, the management server 10 has a file database (DB) 111 and a layout-setting DB 112. The file DB 111 and the layout-setting DB 112 may be created in, for example, the storage unit 14.

In this exemplary embodiment, a "DB" refers to a storage area that stores data. Needless to say, a database application may be used for managing a storage area that stores data.

The display processing unit 101 causes the terminal apparatus 20 that has accessed the management server 10 to display a predetermined user interface. When causing the terminal apparatus 20 to display the user interface, the display processing unit 101 acquires information from the file DB 111 and the layout-setting DB 112 and causes the terminal apparatus 20 to display the user interface based on the acquired information. For example, the display processing unit 101 may be an application for causing a web browser installed in the terminal apparatus 20 to display the aforementioned user interface. The layout of the user interface that the display processing unit 101 causes the terminal apparatus 20 to display will be described later.

The file registering unit 102 registers an image file in the file DB 111 or updates an image file in the file DB 111 based on an image-file registration request from the user.

The file acquiring unit 103 acquires an image file from the file DB 111 based on an image-file acquisition request from the user. Examples of the image-file acquisition request from the user include an image display request and a request for displaying information extracted from an image file.

The following relates to an example of information registered in the file DB 111. FIG. 4 illustrates an example of information registered in the file DB 111. The file DB 111 stores therein a file ID based on which an image file is uniquely identified, content data (binary data) serving as an actual image file, content data (binary data) of a preview image, and attribute information containing a list of attributes and attribute values in the image file. The information registered in the example in FIG. 4 includes image files with file IDs "doc001", "doc002", and "doc003".

FIG. 5 illustrates an example of attribute information 121 containing a list of attributes and attribute values of an image file. The example shown in FIG. 5 relates to item information of data with the file ID "doc001" in the data registered in the file DB 111. The contents of the attribute information 121 may be displayed on the user interface displayed in the terminal apparatus 20. The attribute information 121 contains a list of attributes and attribute values related to the inspection operation.

The attribute information 121 includes information obtained from metadata added to an image file during an imaging process at the inspection site and information generated during an editing process performed using the user interface to be described later. For example, in the attribute information 121 shown in FIG. 5, "imaging date and time", "latitude", "longitude", "altitude", and "imaging direction" are information that may be added to metadata during an imaging process at the inspection site. For example, the latitude, longitude, and altitude added to the metadata of the image may be obtained by a positional information sensor, such as a global positioning system (GPS) sensor, included in a device used for capturing the image. Furthermore, for example, the imaging direction added to the metadata of the image may be obtained by a direction detecting sensor, such as a geomagnetic sensor, included in the device used for capturing the image.

The layout-setting registering unit 104 registers, in the layout-setting DB 112, a layout setting serving as information related to the layout of the user interface displayed in the terminal apparatus 20.

The layout-setting acquiring unit 105 acquires the layout setting from the layout-setting DB 112 and transmits the layout setting to the display processing unit 101. The display processing unit 101 causes the terminal apparatus 20 to display the user interface with the layout based on the layout setting transmitted from the layout-setting acquiring unit 105.

As an alternative to the example in FIG. 3 in which the file DB 111 and the layout-setting DB 112 are provided inside the management server 10, at least one of the file DB 111 and the layout-setting DB 112 may be provided outside the management server 10.

An example of the workflow of the inspection operation used by the information processing system according to this exemplary embodiment will now be described.

Figure 6:
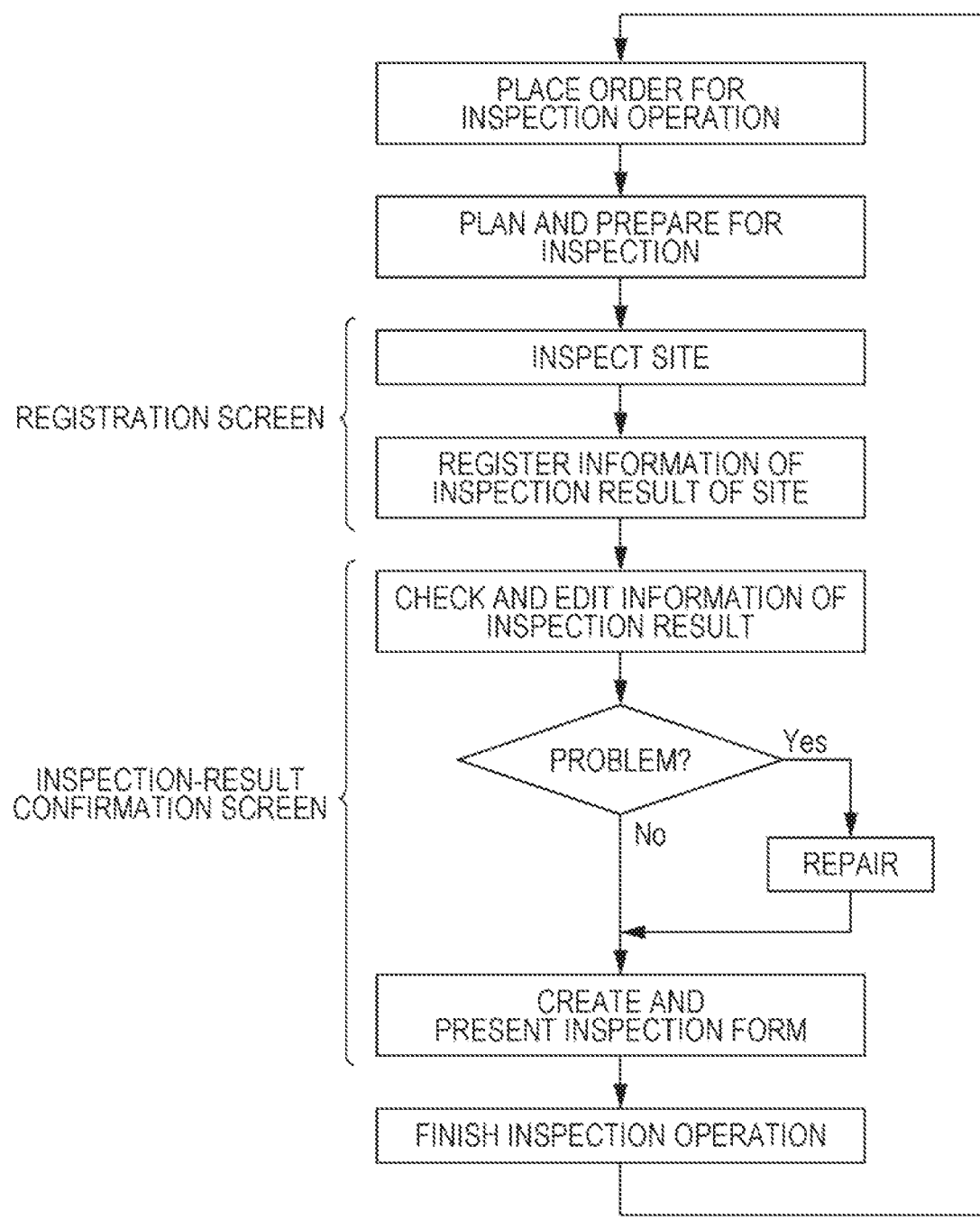
FIG. 6 illustrates an example of the workflow of an inspection operation.

FIG. 6 illustrates the example of the workflow of the inspection operation.

First, an inspection operator receives an order for the inspection operation from an owner of an inspection target, such as a building, road, bridge, or pedestrian bridge.

The operator having received the order for the inspection operation lays out an inspection plan for the inspection target and prepares for the inspection operation. A manager of the operator sets a work schedule and a site inspector as the inspection plan for the inspection target. The manager of the operator prepares an image serving as a proof of a site inspection and a storage destination for inspection information, so as to prepare for the inspection operation. Furthermore, the manager of the operator may customize a user interface for the site inspector as well as a user interface for the manager. The customization results are saved in the layout-setting DB 112.

Subsequently, the site inspector who is to perform the inspection travels to the site of the inspection target and performs the inspection operation. When performing the inspection operation, the site inspector captures an image of the inspection target. The site inspector registers information of the inspection result of the site in the management server 10. The site inspector registers the information of the inspection result together with the image captured at the site. The site inspector may upload the image captured at the site to the management server 10 by using the terminal apparatus 20 from the inspection site, or may upload the image captured at the site to the management server 10 by using the terminal apparatus 20 after leaving the site.

Figure 7:
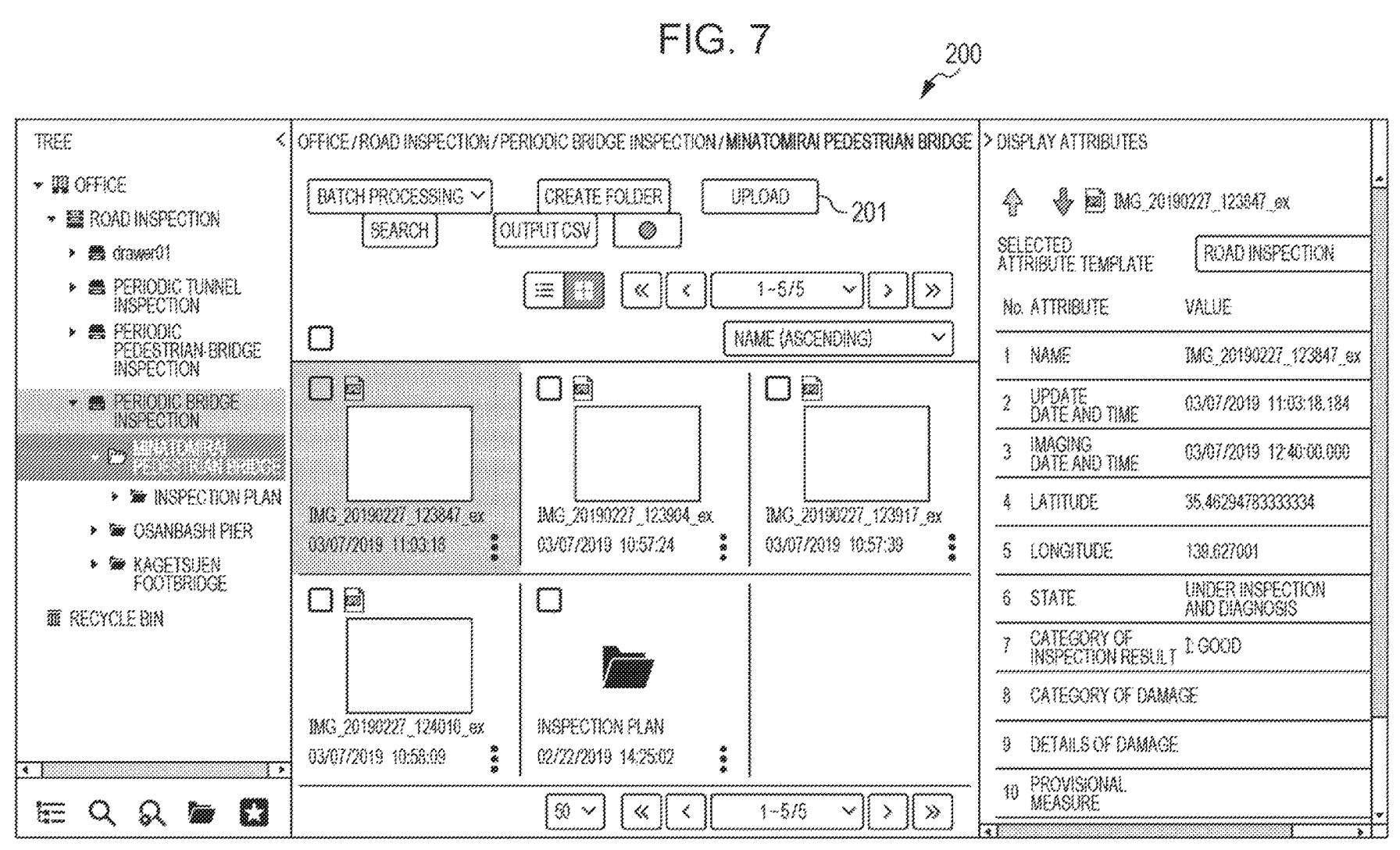

FIG. 7 illustrates an example of a user interface provided by the management server 10. The example shown in FIG. 7 is a user interface 200 used by the site inspector. The user interface 200 is displayed in the terminal apparatus 20. When the site inspector registers the information of the inspection result, the site inspector selects an upload button 201. In response to the selection of the upload button 201, the management server 10 causes the terminal apparatus 20 to display a user interface used for registering the information of the inspection result.

FIG. 8 illustrates an example of a user interface provided by the management server 10. The example shown in FIG. 8 is a user interface 210 used by the site inspector. When the site inspector selects an image file that the site inspector desires to upload to the management server 10, the management server 10 causes the user interface 210 to display information obtained from metadata of the image file. For example, with regard to positional information, information obtained by, for example, the GPS sensor included in the imaging device during the imaging process is displayed on the user interface 210. Furthermore, the site inspector inputs information of the inspection result lacking in the metadata of the image file to the user interface 210. In detail, the site inspector inputs, for example, the name of the inspection site and the state of the inspection site to the user interface 210. Then, when the site inspector selects a register button 211, the image file and the information of the inspection result are saved in the file DB 111 of the management server 10.

When the site inspector completes the inspection, the manager checks the information of the inspection result and edits the inspection result, if necessary. The process for checking and editing the information of the inspection result is performed using a user interface provided by the management server 10. This user interface used for checking and editing the information of the inspection result will be described later.

After the manager checks the information of the inspection result and determines that there is a problem in the inspection target, the manager repairs the inspection target.

After the manager checks the information of the inspection result and completes the repair of the inspection target, the manager uses the information of the inspection result to create an inspection form using a predetermined format. The manager submits the created inspection form to the orderer of the inspection operation. When the inspection form is submitted, the operator ends the series of inspection operation.

Next, the operation of the management server 10 will be described.

Figure 9:
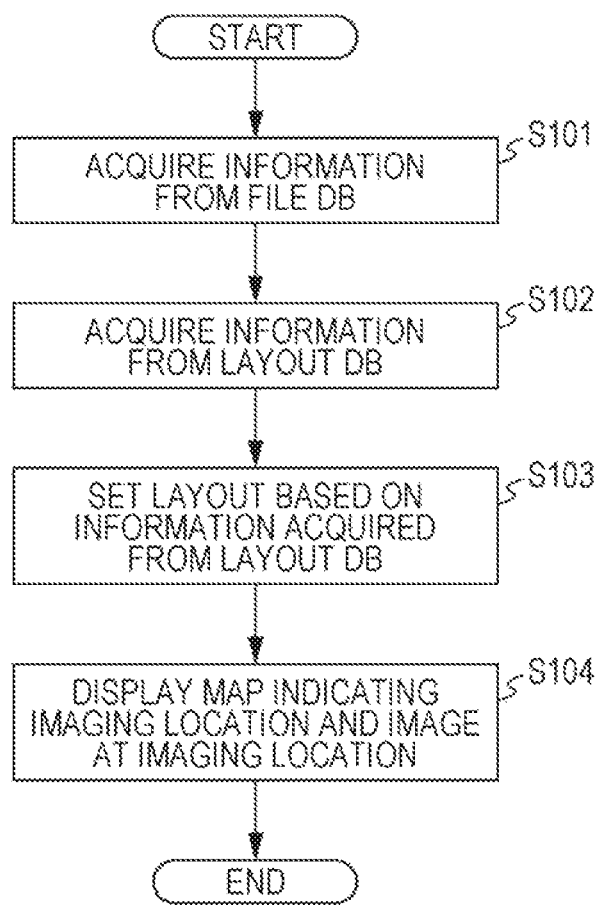
FIG. 9 is a flowchart illustrating the flow of a user interface process performed by the management server.

FIG. 9 is a flowchart illustrating the flow of a user-interface displaying process performed by the management server 10. The CPU 11 reads the image management program from the ROM 12 or the storage unit 14 and executes the program by expanding the program in the RAM 13, whereby the user-interface displaying process is performed.

The flowchart shown in FIG. 9 is an operation example of the management server 10 when the terminal apparatus 20 is operated for displaying a user interface and transmits a request for displaying the user interface to the management server 10.

In step S101, the CPU 11 accesses the file DB 111 to acquire information required for displaying the user interface in the terminal apparatus 20.

In step S102, the CPU 11 accesses the layout-setting DB 112 to acquire information required for displaying the user interface in the terminal apparatus 20. The order in which step S101 and step S102 are performed may be inverted.

In step S103, the CPU 11 sets the layout of the user interface to be displayed in the terminal apparatus 20 based on the information acquired from the layout-setting DB 112. The layout set by the CPU 11 includes multiple regions. The multiple regions include at least three regions, namely, a first region, a second region, and a third region. The first region indicates, on a map, an imaging location of an image saved in the file DB 111 such that the imaging location is selectable by the user. The second region presents the image captured at the imaging location selected in the first region. The third region relates to editing performable by the user on information about the image file presented in the second region. The information displayed in the third region is information about an image file contained in the file DB 111.

The multiple regions may further include a fourth region. The fourth region is used by the user for searching for an image file saved in the file DB 111. The CPU 11 presents, in the first region, an imaging location of an image file compatible with a search condition designated in the fourth region.

After step S103, the CPU 11 causes the terminal apparatus 20 to display the user interface in accordance with the set layout in step S104. The user interface that the CPU 11 causes the terminal apparatus 20 to display is for displaying the map indicating the imaging location and the image captured at the imaging location designated on the map.

Figure 10:
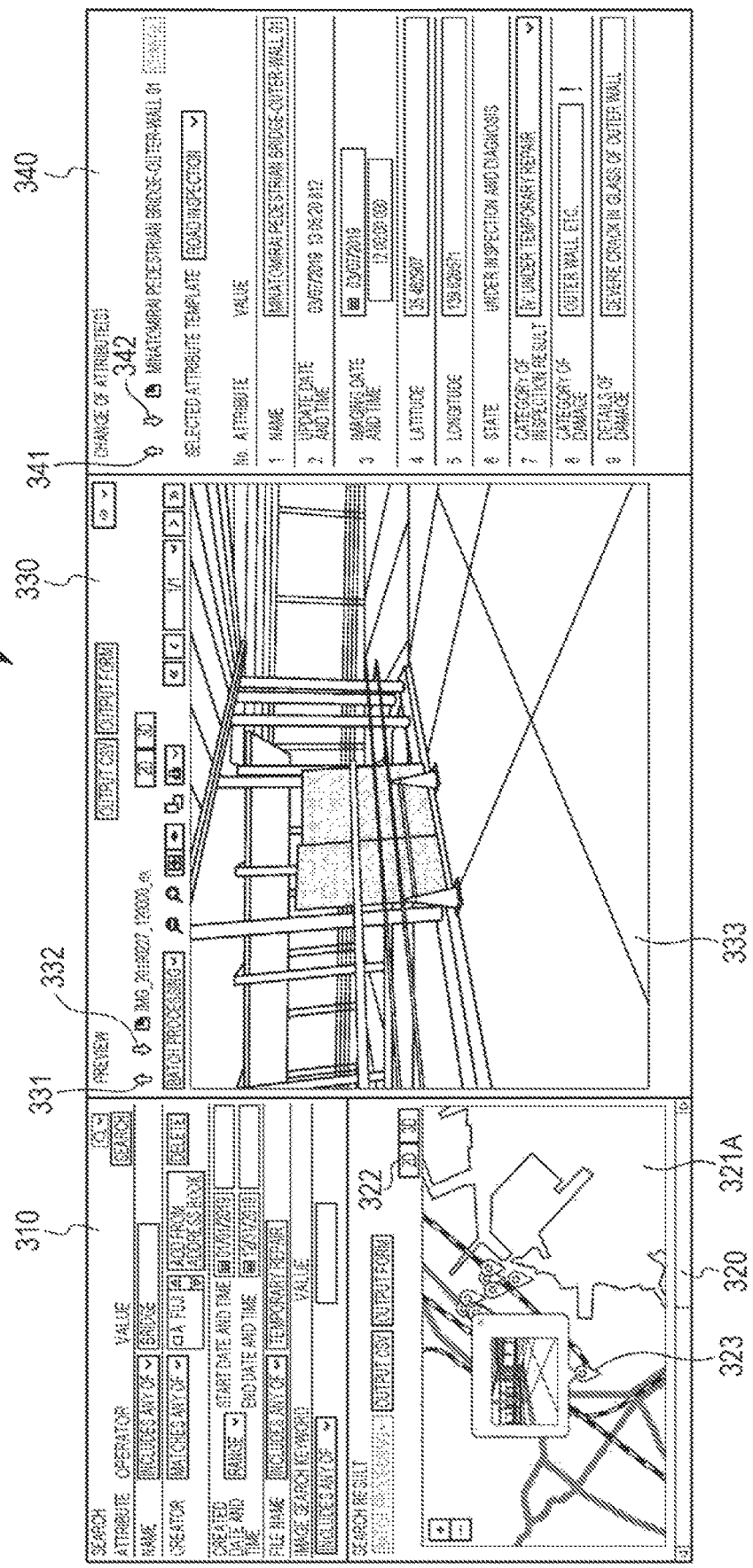
FIG. 10 illustrates an example of a user interface.

FIG. 10 illustrates an example of a user interface that the CPU 11 causes the terminal apparatus 20 to display. A user interface 300 shown in FIG. 10 is used for searching for an image file saved in the file DB 111 and for presenting information about an image file compatible with a search condition.

The user interface 300 has a search region 310, a map display region 320, an image display region 330, and an information display region 340. The search region 310 corresponds to the fourth region mentioned above. The map display region 320 corresponds to the first region mentioned above. The image display region 330 corresponds to the second region mentioned above. The information display region 340 corresponds to the third region mentioned above. The size of each region is changeable in accordance with an operation performed by the user or by changing the settings in the layout-setting DB 112.

The search region 310 is a region used by the user for searching for an image file saved in the file DB 111. When the user designates a search condition in the search region 310 and gives a command for a searching process, the CPU 11 presents a map indicating an imaging location of an image file compatible with the search condition in the map display region 320. The search condition includes conditions set in correspondence with the attributes of the image file, such as an imaging date and time, an imaging location, an inspector, and an inspection result. In the search condition, a condition not included in the attributes of the image file, such as an object included in the image, may be designated. Moreover, a sorting condition for the searching process may be designated in the search region 310.

In a case of periodic inspections, an inspection is performed at a predetermined cycle, such as once every five years. Therefore, by performing filtering based on the imaging date and time, an image captured in a past periodic inspection is effectively extractable. There is also a case where a request is made for searching for an image that includes a specific object. For example, an inspector may sometimes set an object, such as a traffic cone, near an access-restricted area to restrict access to a temporarily-repaired site. The CPU 11 performs an image analysis to search for an image having the object therein, such as the traffic cone, thereby effectively extracting the temporarily-repaired site.

The map display region 320 is where an imaging location of an image file saved in the file DB 111 is presented on a map. FIG. 10 illustrates an example where imaging locations of image files are presented on a two-dimensional map 321A by using pointers 323. When the user performs an operation using, for example, a mouse or a touchscreen to select one of the pointers 323 on the map 321A, the CPU 11 may display the image captured at the corresponding imaging location on the map 321A. With regard to the map 321A, the scale or the direction thereof is changeable in accordance with an operation performed by the user. If an image file has information indicating the imaging direction as attribute information, the CPU 11 may display the information indicating the imaging direction on the map 321A.

The image display region 330 is where an image captured at an imaging location is presented when the imaging location is selected on the map 321A presented in the map display region 320. The image display region 330 includes a reverse button 331 and a forward button 332 for switching image files compatible with the search condition, and an image 333 captured at an imaging location selected on the map 321A in accordance with an operation performed using, for example, the mouse or the touchscreen. Binary data of the image 333 displayed in the image display region 330 is registered in the preview-image column of the file DB 111.

The information display region 340 is where information about an image captured at an imaging location is presented when the imaging location is selected on the map 321A presented in the map display region 320. The information displayed in the information display region 340 is information acquired by the CPU 11 from the file DB 111. The information display region 340 includes a reverse button 341 and a forward button 342 for switching image files compatible with the search condition.

In the example in FIG. 10, the image display region 330 and the information display region 340 are arranged next to each other at left and right sides on the user interface 300. Although the image display region 330 is disposed at the left side in the example in FIG. 10, the exemplary embodiment is not limited to this example.

If the terminal apparatus 20 is equipped with a keyboard or if the terminal apparatus 20 is connected to a keyboard, the CPU 11 may sequentially change the focused imaging location in the map display region 320 in response to an operation performed on a cursor button. For example, when an up button is operated, the CPU 11 may sequentially change a previously-focused imaging location northward to an imaging location closest to the previously-focused imaging location.

Furthermore, if a sorting condition is designated as a search result, the CPU 11 may change the focused imaging location in the map display region 320 in the ascending order or the descending order in response to an operation performed on a cursor button. For example, when a down button is operated in a case where the sorting condition "descending order of registration date and time" is designated, the CPU 11 may sequentially change the focused imaging location, starting from the latest registration date and time. The CPU 11 may perform the same operation between when the up button is operated and when the reverse button 331 or 341 is selected. Moreover, the CPU 11 may perform the same operation between when the down button is operated and when the forward button 332 or 342 is selected.

Accordingly, the CPU 11 changes the focused imaging location in response to an operation performed on a cursor button, the reverse button 331 or 341, or the forward button 332 or 342, so that the management server 10 may allow for browsing of consecutive images as well as browsing and editing of attribute values.

Furthermore, in a case where a searching process is executed in a state where a specific site inspector is designated in the search region 310, the CPU 11 may present the inspection location of the specific site inspector in the map display region 320.

Moreover, in a case where a searching process is executed in the search region 310 based on a condition in which an abnormality is confirmed at a site as a result of an inspection but the site has not been temporarily repaired yet, the CPU 11 may present the non-temporarily-repaired site in the map display region 320. With the non-temporarily-repaired site being presented in the map display region 320, the operator may make arrangements for a temporary repair.

If it is clear from the map 321A displayed in the map display region 320 that many images are registered at the same location or in the same area, it is recognizable that the location undergoes an inspection operation frequently or has undergone many inspection operations. For example, if it is clear from a search result that a certain location has undergone many temporary repairs as a result of a typhoon, there is a high possibility that the location may require a temporary repair again if the location undergoes a typhoon again. Accordingly, the management server 10 displays imaging locations in the map display region 320 so that the map 321A may be used as a hazard map.

The CPU 11 may switch the map displayed in the map display region 320 between a two-dimensional mode and a three-dimensional mode in response to a command from the terminal apparatus 20. The CPU 11 may display, in the map display region 320, a map switch button 322 used for switching the map displayed in the map display region 320 between the two-dimensional mode and the three-dimensional mode.

Figure 11:
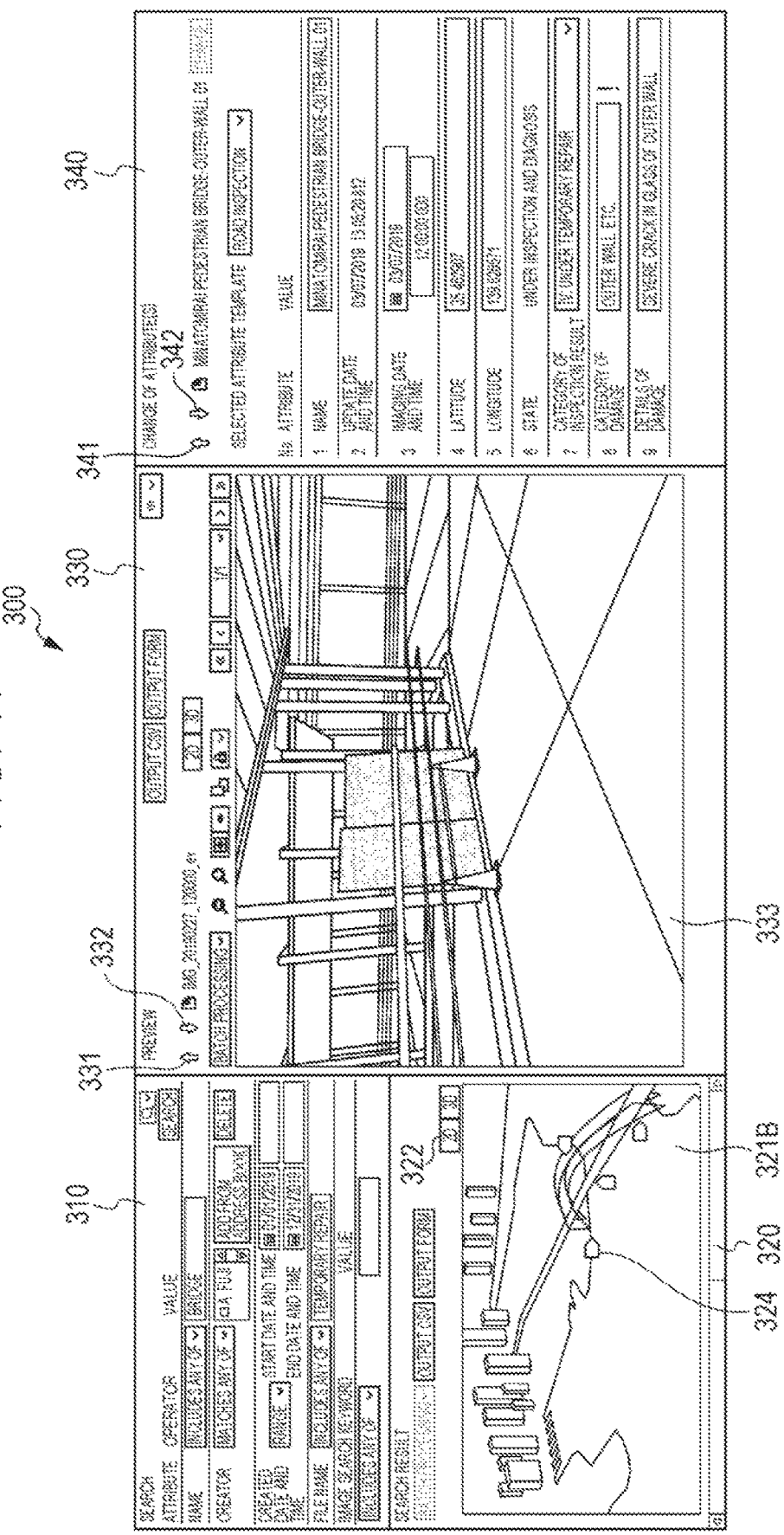
FIG. 11 illustrates an example of a user interface.

FIG. 11 illustrates an example of a user interface that the CPU 11 causes the terminal apparatus 20 to display. The example shown in FIG. 11 corresponds to a case where a three-dimensional map 321B is displayed in the map display region 320 in accordance with a selection made using the map switch button 322. The map 321B has pointers 324 indicating imaging locations and imaging directions of images. Each pointer 324 is arrow-shaped for indicating the imaging direction. The CPU 11 displays the three-dimensional map 321B in the map display region 320 so as to indicate height information of the imaging locations on the three-dimensional map 321B.

As described above, the management server 10 according to this exemplary embodiment presents information about an imaging location on a map, presents an image captured at the imaging location selected on the map, presents information attached to the image, and allows for editing of the information. The management server 10 according to this exemplary embodiment provides a user interface that presents the map, the image, and the information in this manner, so as to assist with a process for checking an inspection result and a process for editing information about the inspection result.

Each of the user interfaces described above may be displayed using general software, such as a web browser, or may be displayed using dedicated software for an inspection operation. Moreover, the layouts of the user interfaces described above are not limited to those shown in the drawings.

In the exemplary embodiment above, the user-interface displaying process executed by the CPU reading the software (program) may be executed by various types of processors other than the CPU. In this case, examples of the processors include a programmable logic device (PLD) the circuit configuration of which is changeable after being manufactured, such as a field-programmable gate array (FPGA), and a dedicated electrical circuit, such as an application specific integrated circuit (ASIC) as a processor having a circuit configuration dedicatedly designed for executing a specific process. Furthermore, the user-interface displaying process may be executed by one of these various types of processors or may be executed by a combination of two or more processors of the same type or different types (e.g., multiple FPGAs or a combination of a CPU and an FPGA). Moreover, the hardware structure of each of these various types of processors is an electrical circuit having a combination of circuit elements, such as semiconductor elements.

As an alternative to the above exemplary embodiment in which the program for the user-interface displaying process is preliminarily stored (installed) in the ROM or the storage unit, the program may be provided by being stored in a non-transitory storage medium, such as a compact disk read-only memory (CD-ROM), a digital versatile read-only memory (DVD-ROM), or a universal serial bus (USB) memory. As another alternative, the program may be downloaded from an external apparatus via a network.

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
execute a process for displaying a plurality of regions and a process for searching an inspection image stored in a database based on a search input by a user, the search input including a specific site inspector,
wherein the plurality of regions include a first region, a second region, and a third region, and
wherein the first region indicates, on a map, an imaging location of an inspection image that is registered in association with the specific site inspector at the imaging location such that the imaging location is selectable by the user, the second region presents the inspection image captured at the imaging location selected in the first region, and the third region relates to editing performable by the user on information attached to the inspection image presented in the second region.

2. The information processing apparatus according to claim 1, wherein the processor sequentially changes the imaging location indicated in a selectable manner in the first region in response to an operation performed by the user.

3. The information processing apparatus according to claim 2, wherein the processor changes the imaging location indicated in the selectable manner in the first region to an imaging location closest to the imaging location selected prior to the change in response to an operation performed on a cursor button by the user.

4. The information processing apparatus according to claim 2, wherein the processor changes the imaging location indicated in the selectable manner in the first region based on a predetermined sorting condition in response to an operation performed on a cursor button by the user.

5. The information processing apparatus according to claim 1, wherein the processor indicates, on the map, information related to an imaging direction of the inspection image in the first region.

6. The information processing apparatus according to claim 5, wherein the processor indicates, on the map, an arrow as the information related to the imaging direction.

7. The information processing apparatus according to claim 1, wherein the plurality of regions further include a fourth region,
 wherein the fourth region is a region used by the user to enter the search input to search for the inspection image, and
 wherein the processor presents, in the first region, the imaging location of the inspection image compatible with a search condition designated in the fourth region.

8. The information processing apparatus according to claim 7, wherein the processor presents, in the first region, the imaging location of the inspection image that includes an object designated in the fourth region.

9. The information processing apparatus according to claim 1, wherein the processor presents the map presented in the first region in a switchable manner between a two-dimensional mode and a three-dimensional mode.

10. The information processing apparatus according to claim 1, wherein the processor arranges the second region and the third region next to each other at left and right sides beside the first region.

11. A non-transitory computer readable medium storing a program causing a computer to execute a process, the process comprising:
 displaying a plurality of regions, and
 searching for an inspection image stored in a database based on a search input by a user, the search input including a specific site inspector,
 wherein the plurality of regions include a first region, a second region, and a third region, and
 wherein the first region indicates, on a map, an imaging location of an inspection image that is registered in association with the specific site inspector at the imaging location such that the imaging location is selectable by the user, the second region presents the inspection image captured at the imaging location selected in the first region, and the third region relates to editing performable by the user on information attached to the inspection image presented in the second region.

12. An information processing method comprising:
executing, by an information processing device, a process for displaying a plurality of regions and a process for searching an inspection image stored in a database based on a search input by a user, the search input including a specific site inspector,
 wherein the plurality of regions include a first region, a second region, and a third region, and
 wherein the first region indicates, on a map, an imaging location of an inspection image that is registered in association with the specific site inspector at the imaging location such that the imaging location is selectable by the user, the second region presents the inspection image captured at the imaging location selected in the first region, and the third region relates to editing performable by the user on information attached to the inspection image presented in the second region.

* * * * *